United States Patent Office 3,575,884
Patented Apr. 20, 1971

3,575,884
METHOD FOR THE PRODUCTION OF ACTIVE CHARCOAL FROM SAWDUST TREATED WITH SULPHURIC ACID
René-Rodolphe Seiler, Lausanne, Switzerland, assignor to Wilhelm Squindo, Lausanne, Switzerland
No Drawing. Filed June 25, 1968, Ser. No. 739,645
Claims priority, application Switzerland, June 27, 1967, 8,908/67; Dec. 8, 1967, 17,120/67
Int. Cl. C01b 31/08
U.S. Cl. 252—422
11 Claims

ABSTRACT OF THE DISCLOSURE

An improved method for producing adsorbent charcoal is disclosed, said method involving the distillation of sawdust from resinous woods in the presence of a predetermined amount of diluted sulphuric acid as a twofold-action catalyst. A modification of the method involves the additional step of reheating, upon cooling, at a temperature exceeding by 50° C. the distillation temperature. The addition of pore-filling, coke-forming components is also contemplated. The charcoal so produced is particularly advantageous for various physico-chemical processes, such as purification of waste and sewage waters and others.

---

This invention relates to a kind of active charcoal obtained by carbonization of comminuted resinous wood, such as sawdust, which is particularly suitable for water filtration and purification purposes.

Many attempts have been made in the past with a view to obtaining active wood charcoal starting from sawdust, also on account of the fact that sawdust is a readily available by-product of timber processing.

This notwithstanding, a charcoal was obtained, which had the form of an extremely fine powder and this, when used for making up fixed filtering beds, has proved, in actual practice, to be virtually unsuitable.

In addition, pressure drops attain exceedingly high values, so that the filtering beds should either be replaced or regenerated with undue frequency.

Methods are known in which wood is carbonized or distilled with sulphuric acid being present, such as for example the methods disclosed in U.S. Pats. Nos. 2,245,579 and 2,171,408, the British patent specn. 498,201 and the German pat. spec. No. 580,962. In all of these instances, however, it should be observed that the distillation of comminuted resinous wood with added sulphuric volume, percentage ratio of wood to sulphuric acid is generally well below the unity, and, lastly, no mention is made of a subsequent activation treatment.

It has now been found, and this is the basic principle of the present invention, that, by performing the distillation of comminuted resinous wood with added sulphuric acid, under controlled conditions, a fibrous charcoal can be obtained, having a straw-like appearance, which, as will be explained in more detail hereinafter, is adapted to making up filtering beds having very satisfactory properties for filtering and purifying either fresh or used waters, an excellent resistance to clogging and high rates of flow in steady flow conditions.

When the filtering bed is intended for the filtration of waters which contain organic substances having a light, flaky texture, or inorganic substances, such as the effluents from the secondary decantation in biological purification stations for household and industrial sewage waters, carbon as obtained from the distillation of sawdust gives very satisfactory results as to purification filtration provided that distillation is carried out under quite particular conditions.

The inventive method for the production of filtering beds consisting of active charcoal from resinous woods comprises the steps of distilling comminuted resinous wood, to which from 3 to 6% by weight of sulphuric acid has been added, diluted in from 15 to 20 parts by volume of water, at a temperature within the range from 450° C. to 700° C. For certain applications, the charcoal thus obtained is subjected, upon cooling, to an additional heat treatment out of the direct contact with atmospherical air, at a temperature which exceeds by at least 50° C. the distillation temperature.

In a preferred embodiment, in connection with certain uses of the filtering masses to be obtained as the end product, the charcoal obtained by distillation is supplemented, prior to being subjected to said additional heat treatment, with a porosity regulating agent.

More particularly, said porosity-regulating agent should be a substance capable of being carbonized in the interior of the pores of the straw-like charcoal as obtained by distillation of sawdust and is, preferably, coal tar pitch, or sugar, or molasses as obtained from the sugar industry, or an admixture thereof.

An outstanding advantage of the present invention lies in that the charcoal, as obtained by distillation of resinous wood sawdust, has the form of a very light material consisting of tiny, extremely spongy flakes, having a large number of large-sized pores: the latter are reduced, by subsequent treatments, to their optimum size adapted to the specific intended use, the manufacture of a wide range of filtering beds being thus made possible.

Another prominent advantage of the present invention is that it permits to prepare fixed filtering beds which have high rates of flow along with a considerable resistance to clogging.

The inventive active charcoal permits also to decolorize in a complete manner water, intended to be consumed, and which had been previously treated with chlorinating agents.

Other features and advantages of the present invention will become apparent from the ensuing detailed description of a few preferred embodiments of the method and the filtering beds, as outlined in the examples.

As outlined above, the initial step of the inventive method involves the distillation of comminuted resinous wood.

The latter, screened on a large-meshed screen, is supplemented with from 3% to 6% by weight, preferably 5%, of concentrated sulphuric acid, to be diluted in 15–20 volumes of water for each volume of acid. The addition of sulphuric acid should be performed cautiously, so as to prevent any possibility of trituration of the product. The homogeneous moistened mass can then be dried until containing a water percentage of 10 to 20% with respect to the weight of the dried wood, or it can be directly fed to the pyrolysis oven.

Sulphuric acid acts as a pyrolysis catalyst and it is believed, though speculatively, that, at the outset, it acts as a dehydration catalyst and then as a sulphating agent. This is confirmed by the examination of the tar obtained by condensing the distillation of vapors. It has been furthermore ascertained that sulphuric acid does away with acetic corrosion phenomena which have been actually experienced in distillation ovens on completion of a few operations carried out with no sulphuric acid being present.

When the filtering bed is intended for purifying absorption operations, such as clarification of water or purification in order to decrease their contents of mineral and/or organic substances in suspension or in solution, the charcoal as obtained from the distillation of sawdust carried out under the aforementioned conditions, is subjected, as outlined above, to activation by bringing it, upon cooling, to a temperature which exceeds by at least 50° C. the distillation temperature and which lies within the range of 500° C.–750° C., 650° C. being the preferred value, and by keeping said charcoal to said activation temperature during at least 20 minutes.

Instead of carrying out said additional heat treatment, it is also possible partially to fill the pores and the interstices between the individual fibers with an auxiliary charcoal, to a greater or lesser degree, according to necessity.

Said auxiliary charcoal is variously selected consistently with the intended use of the filtering bed. The adjustment of the pore-size is carried out with coaltar pitch which had previously been powdered and is added to the charcoal as obtained from pyrolysis of the resinous wood sawdust. The admixture is gradually brought to a temperature of 500° C.–750° C. out of contact with atmospherical air.

The product obtained thereby has the form of a material whose pores are partially and intimately filled with the extremely fine-sized coke resulting from the heat treatment of the aforesaid pitch. Contrary to any expectations, the material retains its incoherent state and affords an increased activity, accompanied by a greater hardness which renders it more resistant from a mechanical standpoint.

If, conversely, it is desired, due to practical use requirements, that a filtering mass be produced having a satisfactory mechanical compactness while retaining the porostiy and activity specifications, it is also possible to admix to the charcoal, obtained as a residue of the distillation step described above, an equal amount by weight of powdered coal tar pitch along with the 100% to 400% by weight with respect to the charcoal, of raw sugar or sugar molasses.

Said mixture, which has been previously treated while being blended, at a temperature of at least 150°–200° C. (approx.) to remove the volatile components, is gradually brought, in a tightly closed oven, to a temperature of 500°–750° C. out of contact with atmospherical air. The compact residue thus obtained is a very homogeneous filtering mass which can be shaped in any desired and appropriate configuration and size.

It has been found that said filtering beds are very unlikely clogged by flocculating agents, such as iron or aluminum hydroxides, as used in the treatment of water.

The charcoal obtained as a residue of the distillation of resinous wood sawdust, upon addition of sulphuric acid, has an apparent specific gravity of 0.185. When the subsequent treatment with coal tar pitch is performed under relative proportions of one part of pitch for two parts of charcoal, the apparent specific gravity of the end product does not exceed 0.2 and is thus well below that of the activated charcoals as conventionally used, for example, in the purification of water.

The activated charcoal obtained according to the present invention, in the form of flakes or of compact masses, is capable of purifying surface waters, river or lake waters, and effluents of biological purification stations as well.

Filtration is conducive to a perfectly clear filtrate, having a biochemical oxygen demand, after 5 days ($DBO_5$) of less than 5 milligrams per liter for an activated charcoal filtering bed having a thickness of 120–130 cms., the starting $DBO_5$ rating being in the order of 30 mgs./liter.

In the particular case of sewage waters, which often contain considerable amounts of surfactants, it has been found that the activated charcoal obtained with the inventive method exhibits an extremely intense foam-killing action.

EXAMPLE 1

1,000 grams (about 5 liters) of coarse fir wood sawdust are treated with 500 mls. of a 10% aqueous solution of sulphuric acid. The mass is carefully blended and dried until reducing its weight to about 1,200 grs., whereafter it is subjected to distillation out of contact with the atmospherical air in an oven at a temperature of 500°–550° C.

After 3 hours, when gas evolution is over, heating is discontinued and the mass is allowed to cool out of contact with air to about 200° C. and then in atmospherical air until attaining the ambient air temperature. The charcoal thus obtained has a straw-like texture and has been used for making up a filtering bed having a thickness of 100 cms.: the filtration velocity was 10 to 12 meters an hour.

EXAMPLE 2

1,000 grs. of coarse fir wood sawdust are treated with 500 mls. of a 10% solution of sulphuric acid. The mass, carefully blended, is dried to a weight of about 1,200 grs. and then subjected to distillation in an oven at a temperature of 500°–550° C.

After three hours, when gas evolution is almost over, heating is discontinued and the mass is allowed to cool out of contact with air to about 200° C. and then in free air down to the temperature of the ambient air. Then, an additional heating step at 600°–620° C. is carried out during one hour, whereupon cooling is effected under the conditions suggested above. The charcoal obtained has the form of glittering flakes, is porous and lightweight, with an apparent specific gravity of 0.190.

Tests performed with a filter formed with said charcoal and having a thickness of 100 cms. for the filtering bed, have shown that the filtration velocity is of about 12 meters an hour of water in the gravity filter and up to 20 meters an hour under a pressure of 0.2 kg./sq. cm.

Tests have also been carried out to ascertain the activity of the activated charcoal towards iodine, phenol and methylene blue. These tests have been conducted by the Swiss Federal Experimental Laboratory (EMP) at Lausanne, and are concerned with the following samples:

(a) Resinous charcoal: 1.2 mm. to 2 mm. diameter flakes obtained by carbonization of sawdust according to the invention and subsequent activation.

(b) Charcoal obtained by simply carbonizing sawdust (according to the first stage of this invention) and deprived of the fine powder.

(c) Lurgi-Degussa charcoal, in the form of granules having a diameter in the range of 1 to 2 mms., obtained from solid wood. The results are tabulated below:

| | Activity towards— | | |
|---|---|---|---|
| | Iodine [1] | Phenol [2] | Methylene blue [3] |
| (a) Resinous charcoal | 9.0 | 794 | 5.1 |
| (b) Sawdust charcoal | 5.3 | 840 | 0.9 |
| (c) Lurgi-Degussa charcoal | 7.9 | 796 | 1.4 |

[1] Results expressed as mls. of N/10 solution of iodine per 0.1 gr. charcoal.
[2] Results expressed in mgrs. of phenol absorbed by 1 gr of charcoal.
[3] Results expressed in mls. of a 0.15% solution of methylene blue per 0.1 gr. charcoal.

EXAMPLE 3

One kilogram of resinous wood sawdust obtained by distillation of sawdust supplemented by 5% of conc. sulphuric acid, diluted in 18 volumes of water, at a temperature of about 570° C., is supplemented by ½ kg. of finely ground coal tar pitch and the mixture is subjected to a careful blending until obtaining a homogeneous mass by bringing it to a temperature of 200° C. with evolution of the more volatile portions of pitch. As the evolution of fumes is virtually over, the mass is placed in a container, which is introduced in an airtight oven where it is gradually brougth during 12 hours to a temperature of 630° C. At this temperature, a correct carbonization is attained. The mass is slowly allowed to cool in the oven during 24 hours and is then removed. The mass is in the form of loose flakes, harder than the starting ones and having an improved activity. This mass can make up, in beds of 1 meter thickness, a filter which allows filtration velocities of 10 meters an hour by gravity and up to 18 meters an hour under a pressure of 0.2 kg./sq. cm., a predominant fraction of the dissolved organic substances, more particularly detergents, being retained.

EXAMPLE 24

One kilogram of resinous wood sawdust charcoal obtained according to the method described above is supplemented with 1 kg. of finely ground coal tar pitch. Two kgs. sugar are then added and the mixture is thoroughly blended until obtaining a homogeneous mass: the latter is brought to a temperature in the order of 200° C. with evolution of the more volatile fractions of pitch, as evidenced by the formation of a flame. As the evolution is over, the mass is poured in a mold and slowly brought, in an airtight oven, to a temperature of 650° C. and kept at said temperature during 30 minutes.

Upon cooling, the mass forms a porous filter which permits the filtration by gravity of about 7 cubic meters an hour per square meter of filter, the thickness of the filtering bed being about 30–40 cms.

It is important to note that, in order to render the biological oxygen demand after 5 days uniform and constant, the thickness of the filtering bed should be increased as porosity is increased.

In practice, the filtering mass obtained according to Example 3 should have a thickness of 30 to 40 cms., to ensure the obtention of a filtrate having a $DBO_5$ rating not in excess of 20 mgms. oxygen per liter.

The mass produced according to Example 4 should have a bed thickness of about 80 to 100 cms. to ensure that the same uniform value of $DBO_5$ be obtained. The above given values are based on an initial $DBO_5$ value of not more than 30 mgms. oxygen per liter for the water to be filtered.

It is apparent that, if not so, the thickness of the filtering bed can be increased, or, as a more advantageous alternative, water could be subjected to a preliminary purification, such as by the agency of a flocculating agent, in view of the above mentioned resistance of the filtering mass to clogging.

In this connection, tests have been performed with the inventive activated charcoal on town sewage water which had been previously subjected to biological purification and precipitation of the suspended substances by flocculation and settling. The results which have been obtained have confirmed the efficiency and the validity of the inventive charcoal. As a matter of fact, samples taken at appropriate time intervals both upstream and downstream of the filter have shown that upstream of the filter the $DBO_5$ rating, as milligrams of oxygen per liter was never below 10.2, whereas upstream of said filter said value never exceeded 1.5.

Other tests were made according to the following conditions. In a first test, water of a water stream (Olona river) which was heavily polluted by industrial and sewage waters had been taken and preliminarily subjected to flocculation and settling treatments, then filtered through a bed of activated charcoal of the thickness of 100 cms., at a filtration velocity of 11 meters an hour.

The results are displayed in the following Table 1.

TABLE 1.—FILTRATION OF WATER OF THE OLONA RIVER

| Properties of the water | Untreated | Clarified | Upon filtration of— | |
|---|---|---|---|---|
| | | | 2 liters | 20 liters |
| Color | Cloudy yellow. | Cloudy yellowish. | Colorless and clear. | Colorless and clear. |
| Smell | Disgusting | Slightly unpleasant. | Odorless | Odorless. |
| pH | 7.5 | 8.2 | 7.9 | 7.9. |
| Solids in suspension | 117 p.p.m | 37 p.p.m | | |
| A.O. 4 hours | 52 p.p.m | 7 p.p.m | 1 p.p.m | 2.5 p.p.m. |
| Total phosphorus as $PO_4$ | 5.2 p.p.m | 0.21 p.p.m | 0.08 p.p.m | 0.06 p.p.m. |
| Polyphosphates as $PO_4$ | 3.8 p.p.m | 0.16 p.p.m | 0.06 p.p.m | 0.05 p.p.m. |
| Foam | High, persistent. | Fairly, persistent. | None | None. |

NOTE—A.O. 4 hours: residual oxydability with permanganate after four hours.

Other tests were performed on sewage waters which had previously been purified by flocculation and then clarified.

Tables 2 and 3 which follow report the results of a filtration carried out at filtration velocities of 10 and 6 meters an hour, respectively.

TABLE 2.—TEST WITH SEWAGE WATER

| Characteristics of the sewage | At the sewer | Clarified by flocculation | Upon filtration of— | | Upon washing | Upon filtration of 60 liters |
|---|---|---|---|---|---|---|
| | | | 20 liters | 40 liters | | |
| Color | Cloudy yellow. | Cloudy yellowish. | Colorless, min. turbidity. | Colorless, slightly turbid. | Colorless, slightly turbid. | Colorless, min. turbidity. |
| Odor | Disgusting | Slightly unpleasant. | Odorless | Almost odorless. | Odorless | Odorless. |
| pH | 8.1 | 8.4 | 8.3 | 8.4 | 8.3 | 8.3. |
| Solids in suspension, p.p.m | 272 | 28 | | | | |
| A.O. 4 hours, p.p.m | 98 | 9 | 2.6 | 3.7 | 2.1 | 1.6. |
| Total phosphates, as $PO_4$, p.p.m | 9.2 | 0.3 | 0.12 | 0.16 | 0.13 | 0.13. |
| Polyphosphates, $PO_4$, p.p.m | 5.4 | 0.21 | 0.11 | 0.14 | 0.13 | 0.12. |
| Foam | High, persistent. | Fairly, persistent. | None | Short lasting. | Almost nil. | Almost nil. |
| A.B.S., p.p.m | 3 | 3.7 | 0.4 | 1.1 | 0.62 | 0.4. |
| Ammoniacal nitrogen, p.p.m | 32.6 | 3.2 | 0.1 | 0.17 | 0.08 | 0.11. |

NOTE: A.B.S. connotes synthetic detergents.

TABLE 3.—TEST WITH SEWAGE WATER

| Characteristics of the sewage | At the sewer | Upon clarification | Upon filtration of— | |
|---|---|---|---|---|
| | | | 20 liters | 40 liters |
| Color | Cloudy yellow. | Cloudy yellowish | Colorless, almost clear. | Colorless, almost clear. |
| Odor | Disgusting | Slight | Odorless | Odorless. |
| pH | 8.1 | 8.4 | 8.3 | 8.3. |
| Solids in supension, p.p.m | 272 | 32 | | |
| A.O., 4 hours, p.p.m | 98 | 9 | 1.6 | 1.4. |
| Total phosphates, PO₄ p.p.m | 9.2 | 0.47 | 0.13 | 0.07. |
| Polyphosphates, PO₄, p.p.m | 5.4 | 0.31 | 0.11 | 0.07. |
| Foam, p.p.m | High, persistent. | Persistent | Almost nil | Nil. |
| A.B.S., p.p.m | 3 | 3.9 | 0.4 | 0.1. |
| Ammoniacal nitrogen, N, p.p.m | 32.6 | 2.8 | 0.12 | 0.06. |

As regards other possible fields of application of filtering masses based on active charcoal made according to the present invention, the following can be enumerated:

(a) Dechlorination

Excess chlorine can be removed, both in potable waters and in waste waters, by causing them to pass through activated charcoal (volume of charcoal equal to 1/25 of the maximum flow of water in one hour). Chlorine is converted itno hydrogen chloride by catalysis so that usually no regeneration of the charcoal in proper sense is required.

(b) Removal of phenol from waste industrial waters

Phenol occurrence may be experienced in waste waters of several industries, such as petroleum refining plants and metallurgical industries. It can be removed with several methods such as biological oxidation and solvent extraction but, if the phenol values are not exceedingly high, they can be removed by causing water to percolate through a column containing a volume of active charcoal equal to one tenth of the hourly rate of flow of water. Regeneratin is carried out, as a rule, after 3 to 6 months by causing steam to pass through the filter during one hour and subsequent washing with 5% soda at 80° C.

(c) Deoiling

Active charcoal can be used to remove mineral oils from condensates or from waste waters of the petroleum refining plants, provided that said water does not contain more than 10 p.p.m. of oil, whereas regeneration is extremely difficult with the conventional active charcoals.

(d) Decolorization

Active charcoal lends itself well in decolorizing dyeing plant waste waters, even though not all dyestuffs are adsorbed.

(e) Treatment of waste waters from explosive factories

These contain the residue of preparation of nitrotoluene and are strongly colored and slightly acidic, so that the only treatment adopted is percolation of the effluents on activated charcoal. The utilization of the activated charcoal made according to the invention could also be envisaged for decontaminating radioactive waters, since it could be subsequently burned and the ashes buried in undestructible containers.

The inventive activated charcoal could be employed, lastly, instead of the conventional charcoals available on the market or instead of certain types of resins, for certain particular processes, such as decolorization and purification of juices in the sugar industry, decolorization of dark colored wines to manufacture clear wines or wine-based aperitifs (an operation which is permitted by the law within certain limits), and like uses.

The embodiments of the invention in which an exclusive property or privilege is claimed are defined as follows:

1. A method for the production of a filtering mass comprising charcoal, said method comprising mixing sawdust of a resinous wood with from 3 to 6% by weight with respect to the weight of said wood of concentrated sulphuric acid in 15 to 20 volumes of water with respect to the volume of the acid, distilling the mixture at a temperature between 450° C. and 700° C. in the absence of air to obtain charcoal, allowing the charcoal to cool and then further heating same in the absence of air for at least 20 minutes at a temperature which exceeds by at least 50° C. the distillation temperature.

2. A method according to claim 1 wherein the charcoal obtained from said distillation and which has a straw-like texture, is admixed, prior to said subsequent heating, with a coke-forming ingredient adapted to fill the pores of said straw-like textured charcoal to a predetermined extent and the homogeneous mixture thus formed is heated at a final temperature of 450° C.–700° C.

3. A method according to claim 1, wherein the amount of concentrated sulphuric acid equals the 5% of the weight of the dry wood.

4. A method according to claim 2, wherein said coke-forming ingredient is powdered coal tar pitch.

5. A method according to claim 4, wherein the weight ratio of powdered coal for pitch to charcoal is between 0.25 and 1.00.

6. A method according to claim 2, wherein said coke-forming ingredient is sugar or molasses.

7. A method according to claim 2, wherein said coke-forming ingredient is a mixture of coal tar pitch and sugar or molasses.

8. A method according to claim 7, wherein said pitch is added in a weight ratio between 1 to 1 and 1 to 4 with respect to said straw-textured charcoal and said sugar is added in an amount between 100% and 400% by weight with respect to said charcoal.

9. A method according to claim 1, wherein said heat treatment of said mixture consists of an initial heating with evolution of flammable volatile components at about 150° C.–200° C. and a further heating at a temperature of 450° C.–700° C. for at least 30 minutes.

10. A filtering mass prepared according to the method claimed in claim 1.

11. A filtering mass according to claim 10, and having an apparent specific gravity not greater than 0.2.

References Cited

UNITED STATES PATENTS

| 2,546,903 | 3/1951 | Morrell | 252—422 |
| 3,248,303 | 4/1966 | Doying | 252—422X |

FOREIGN PATENTS

| 251,636 | 7/1927 | Great Britain | 252—422 |
| 273,683 | 6/1927 | Great Britain | 252—423 |
| 852,661 | 10/1960 | Great Britain | 252—422 |

DANIEL E. WYMAN, Primary Examiner

P. E. KONOPKA, Assistant Examiner

U.S. Cl. X.R.

23—209.2; 210—40; 252—445; 260—627